United States Patent
Wang (10) Patent No.: US 10,024,703 B2
(45) Date of Patent: Jul. 17, 2018

(54) CORIOLIS MASS FLOWMETER (71) Applicant: Krohne AG, Basel (CH)

(72) Inventor: Tao Wang, Canterburry (GB)

(73) Assignee: Krohne AG, Basel (CH)

( * ) Notice: Subject to any disclaimer, the term of this patent is extended or adjusted under 35 U.S.C. 154(b) by 0 days.

(21) Appl. No.: 14/689,620

(22) Filed: Apr. 17, 2015

(65) Prior Publication Data

US 2015/0377674 A1 Dec. 31, 2015

(30) Foreign Application Priority Data

Apr. 17, 2014 (DE) .......................... 10 2014 105 580

(51) Int. Cl.
*G01F 1/84* (2006.01)

(52) U.S. Cl.
CPC .......... *G01F 1/8495* (2013.01); *G01F 1/8427* (2013.01)

(58) Field of Classification Search
CPC ........ G01F 1/84; G01F 1/8409; G01F 1/8436; G01F 1/8495
See application file for complete search history.

(56) References Cited

U.S. PATENT DOCUMENTS

| | | | |
|---|---|---|---|
| 5,907,104 A * | 5/1999 | Cage | G01F 1/8431 73/861.355 |
| 7,168,329 B2 | 1/2007 | Bell et al. | |
| 8,316,722 B2 | 11/2012 | Bitto et al. | |
| 8,327,719 B2 | 12/2012 | Rieder et al. | |
| 8,333,119 B2 | 12/2012 | Anklin-Imhof et al. | |
| 8,333,120 B2 | 12/2012 | Bitto et al. | |
| 8,333,121 B2 | 12/2012 | Bitto et al. | |
| 8,336,395 B2 | 12/2012 | Keita et al. | |
| 8,336,396 B2 | 12/2012 | Bitto et al. | |
| 8,347,736 B2 | 1/2013 | Bitto et al. | |
| 8,353,220 B2 | 1/2013 | Hussain et al. | |
| 8,381,600 B2 | 2/2013 | Huber | |
| 8,695,439 B2 * | 4/2014 | LeWinter | G01F 1/8418 73/861.357 |

(Continued)

FOREIGN PATENT DOCUMENTS

DE 10 2008 023 056 A1 11/2009
WO 2009/120222 A1 10/2009

(Continued)

*Primary Examiner* — Natalie Huls
(74) *Attorney, Agent, or Firm* — David S. Safran (57) ABSTRACT A Coriolis mass flowmeter having at least one measuring tube that is excitable to oscillations, at least one oscillation generator, at least two oscillation sensors for receiving oppositely influenced oscillation parts of the measuring tube oscillation, at least one evaluation unit and at least two holding devices for holding the oscillation sensors, wherein at least one part of an oscillation sensor is attached to each holding device. Additionally, a Coriolis mass flowmeter that requires little service and is easy to repair, is implemented in that the oscillation sensors each comprise at least one primary oscillation sensor and a secondary oscillation sensor, and that the primary oscillation sensor and the secondary oscillation sensor are connected to the evaluation unit in such a manner that the measuring signal of the primary oscillation sensor and the measuring signal of the secondary oscillation sensor can be detected separately by the evaluation unit.

10 Claims, 10 Drawing Sheets

(56) References Cited

U.S. PATENT DOCUMENTS

| | | | |
|---|---|---|---|
| 9,052,225 B2 | 6/2015 | Anklin-Lmhof et al. | |
| 9,335,196 B2 | 5/2016 | Kolahi et al. | |
| 2002/0020228 A1* | 2/2002 | Ohnishi | G01F 1/8418 73/861.357 |
| 2005/0268731 A1* | 12/2005 | Hussain | G01F 1/8413 73/861.357 |
| 2011/0016991 A1* | 1/2011 | Pankratz | G01F 1/8418 73/861.357 |
| 2012/0048034 A1* | 3/2012 | Hussain | G01F 1/8495 73/861.357 |
| 2012/0227512 A1* | 9/2012 | Jukes | G01F 1/8422 73/861.357 |
| 2013/0256469 A1* | 10/2013 | Rasche | F16L 3/237 248/69 |
| 2015/0260559 A1* | 9/2015 | Werbach | G01F 1/8404 73/649 |
| 2016/0209257 A1* | 7/2016 | Wang | G01F 1/8495 |

FOREIGN PATENT DOCUMENTS

| | | |
|---|---|---|
| WO | 2013/062538 A1 | 5/2013 |
| WO | 2014/031103 A1 | 2/2014 |

\* cited by examiner

CORIOLIS MASS FLOWMETER

BACKGROUND OF THE INVENTION

Field of the Invention

The invention relates to a Coriolis mass flowmeter having at least one measuring tube excitable to oscillations, at least one oscillation generator, at least two oscillation sensors for receiving opposingly influenced oscillation parts of the measuring tube oscillation, at least one evaluation unit and at least two holding devices for holding the oscillation sensors, wherein at least one part of an oscillation sensor is attached to each holding device.

Description of Related Art

Coriolis mass flowmeters are known in the prior art in a plurality of designs. Mass flowmeters that function using the Coriolis principle usually have at least one oscillation generator, with which the measuring tube is excited to oscillation—or possibly also several measuring tubes are excited to oscillation—and often have two oscillation sensors, with which the obtained oscillation or obtained oscillations of the measuring tube is/are recorded. The oscillation sensors are usually attached to the measuring tube on the inlet and outlet side. Without flow, the signals of the two oscillation sensors are essentially in phase. In the case of mass flow, there is differently-directed Coriolis force at the input and output side, which leads to a phase shift between deflections and thus between the two signals, wherein the phase shift is proportional to the mass flow within the measuring tube; this is what is meant when it is said that the oscillation sensors are designed for receiving opposingly influenced oscillation parts.

The oscillation generator and the oscillation sensors are mostly constructed so that they have a permanent magnet as well as a coil, in order to transmit oscillations to the measuring tube using electrical means or to record oscillations of the measuring tube.

From experience, the applicant has knowledge of Coriolis mass flowmeters with one measuring tube or also several measuring tubes, one oscillation generator and two oscillation sensors, in which the oscillation sensors are attached to a holding device on the input and output side and are connected to the tube by means of the holding device. The Coriolis mass flowmeters known from the prior art, however, have the disadvantage that, in the case of malfunction or defect of even only one of the oscillation sensors, the sensors can only be exchanged or serviced with difficulty or by interrupting running production, which, in production of high-grade end products, can lead to substantial economic and also technical disadvantages. Additionally, a particular demand is placed on the measuring accuracy in the production of high-grade components. This means more than being as accurate as possible, in that a constant high quality is maintained over a long period of time.

SUMMARY OF THE INVENTION

Thus, the object of the invention is to provide a Coriolis mass flowmeter that requires little servicing or can be easily repaired during operation.

The above-derived object is met with a Coriolis mass flowmeter of the type being discussed here in that the oscillation sensors each comprise at least one primary oscillation sensor and a secondary oscillation sensor, and that the primary oscillation sensor and the secondary oscillation sensor are connected to the evaluation unit in such a manner that the measuring signal of the primary oscillation sensor and the measuring signal of the secondary oscillation sensor can be detected separately by the evaluation unit.

In the Coriolis mass flowmeter according to the invention, the oscillation sensors are consequently redundantly designed, which increases safeguarding against malfunction, since, when one oscillation sensor is defective, a second one can be used, and for example, the defective sensor can be exchanged or serviced on-site, without interrupting production.

A primary oscillation sensor and/or a secondary oscillation sensor, in one preferred design, each comprise at least two sensors connected to one another, which, for example, are attached to a holding device on the top or bottom of the measuring tube.

Only parts of an oscillation sensor can be attached to the holding devices. "Part of an oscillation sensor" means that only a first part of an oscillation sensor is attached—for example, to an attachment lug. A complete oscillation sensor for the operation of a Coriolis mass flowmeter results, preferably, first with the interaction of two oppositely situated sensors, wherein the measuring tube is located between the two sensors in this arrangement. In this manner, both sensors of one oscillation sensor can interact with one another during operation of the Coriolis mass flowmeter in order to detect the oscillations of the measuring tube.

One advantage of the redundant oscillation sensors in the present invention is, on the one hand, the redundancy itself. Since the measuring signals of the primary and secondary oscillation sensors can be separately recorded by the evaluation unit, the secondary oscillation sensor does not need to be continuously in operation. In this manner, the secondary oscillation sensor can be put directly into operation in the case of a defect in the primary oscillation sensor, without having to interrupt the running process. An exchange or necessary repair of the primary oscillation sensor is then also possible during operation.

A further advantage of the invention is an increased measuring accuracy when the primary and secondary oscillation sensors are used at the same time. In continuous operation, the signals can be added together. Both signals can also be compared to one another. Deviations from the exact value can thus be quickly recognized.

A further advantage of the invention is seen in a possible calibration function. The primary oscillation sensor is continuously operated, wherein the secondary oscillation sensor serves as a reference. The secondary oscillation sensor is thus only turned on from time to time, in order to recognize possible deviations or errors of the primary oscillation sensor and to subsequently rectify them. The output signals of the primary oscillation sensor can then, again, be compared to those of the reference sensor, the evaluation unit can report deviations, for example for diagnostic purposes, and/or can signal an alarm when a deviation threshold is exceeded.

One design of the present invention provides that the sensors of the primary and secondary oscillation sensors are located on the same holding device and that the sensors have the same axial distance to the oscillation generator. This means that two sensors are arranged over one another on one side of the holding device. This correspondingly also holds true for the sensors on the other side of the holding device, so that the sensors, overall, are located on the same axis. Since each oscillation sensor comprises two sensors, there are varied connecting possibilities for the sensors to form a primary and a secondary oscillation sensor. One design provides that the two outermost sensors, i.e., the two sensors whose distance to the measuring tube is the greatest, form the primary or secondary oscillation sensor and the innermost sensors, i.e., the two sensors whose distance to the measuring tube is smaller, form the other oscillation sensor. Likewise, a combination of inner and outer sensors is possible, so that, overall, four different connecting possibilities can be implemented in one design.

A further design of the invention provides that the primary oscillation sensor and the secondary oscillation sensor have different distances to the oscillation generator, i.e., that the two sensors are located on one side of the holding device on one axis that essentially runs parallel to the measuring tube. In this design, there are also four connecting possibilities for forming the primary and secondary oscillation sensors. Thus, the primary oscillation sensor can be formed by the two sensors that are either closer or farther from the oscillation generator or, rather, of one sensor that has a greater distance to the oscillation generator and one sensor that has a smaller distance to the oscillation sensor. One advantage of this design is the possibility of a more compact construction of the holding device, since this can be narrower due to the arrangement of the sensors located next to one another.

In a further design of the invention, the holding device is formed of a first and second part, so that the primary oscillation sensor and the secondary oscillation sensor are each attached to two separate parts of the holding device. The arrangement of sensors is thus carried out, preferably, as described above, in that they have different distances to the oscillation generator, however, constructions having the same distance are also possible. There are also four possibilities for connecting the sensors to form the primary and secondary oscillation sensors. However, two possibilities are given by the arrangement of the sensors of the primary oscillation sensor on either the first part of the holding device or on the second part of the holding device, wherein the primary oscillation sensor has either a greater or lesser distance to the oscillation generator than the sensors of the secondary oscillation sensor. It is equally possible that one sensor of the primary oscillation sensor is attached to the first part of the holding device and the other sensor is attached to the second part of the holding device, so that, here, the connections of the primary and of the secondary oscillation sensor intersect.

In detail, there are many possibilities for designing and further developing the Coriolis mass flowmeter according to the invention as will be apparent from the following detailed description of preferred embodiments in conjunction with the accompanying drawings.

DETAILED DESCRIPTION OF THE INVENTION

Figure 1:
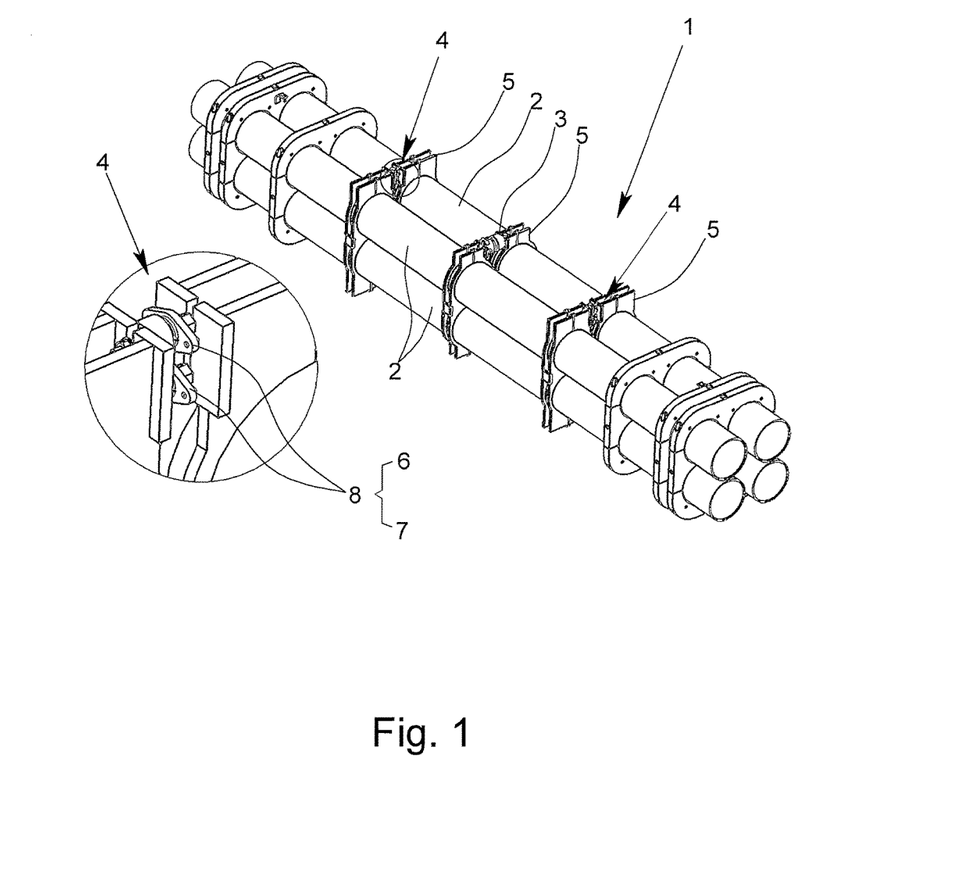
FIG. 1 is perspective view of an embodiment of a Coriolis mass flowmeter.

FIG. 1 shows and embodiment according to the invention of a Coriolis mass flowmeter 1 having four measuring tubes 2, one oscillation generator 3, two oscillation sensors 4 and three holding devices 5. Each oscillation sensor 4 comprises one primary oscillation sensor 6 and one secondary oscillation sensor 7 and each individual oscillation sensor 4 is formed from two sensors 8 connected to one another. Since the oscillation generator 3 is located between the oscillation sensors 4, the oppositely influenced oscillations, which are caused due to the Coriolis effect through the flowing fluid, can be detected. The oscillation sensor 4 and the oscillation generator 3 are, in this embodiment, attached to the measuring tubes 2 with the holding devices 5.

Figure 2A:
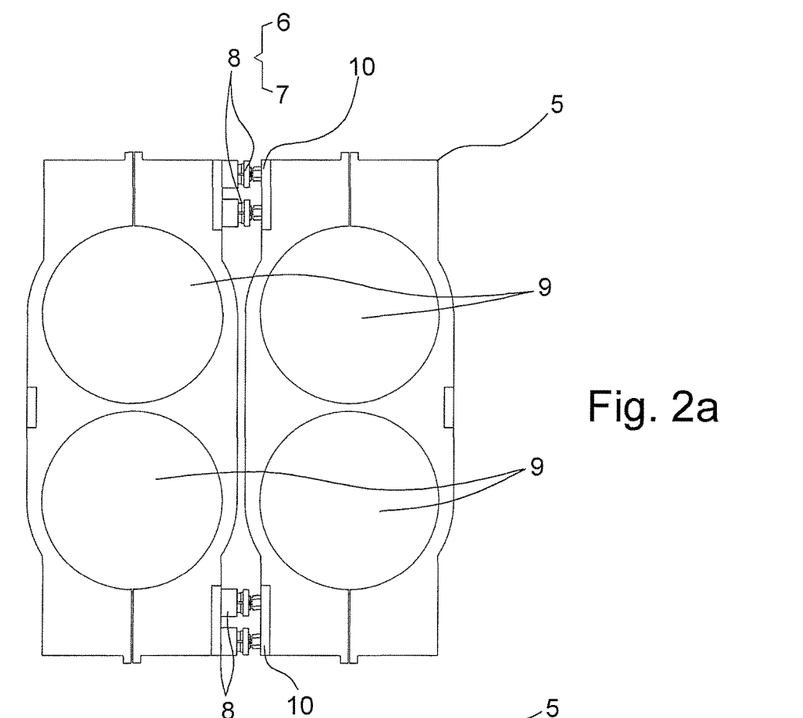
FIG. 2a is a front view of an embodiment of a holding device with primary and secondary oscillation sensors.
Figure 2B:
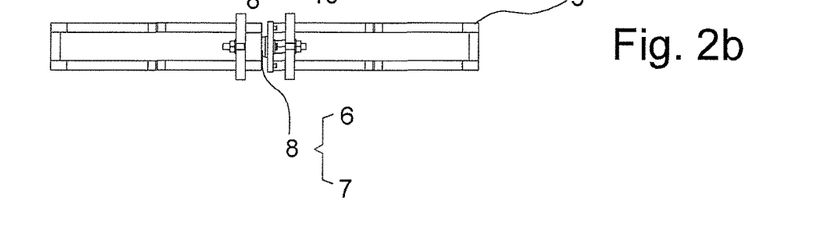
FIG. 2b is a top view of an embodiment of a holding device with oscillation sensors.
Figure 2C:
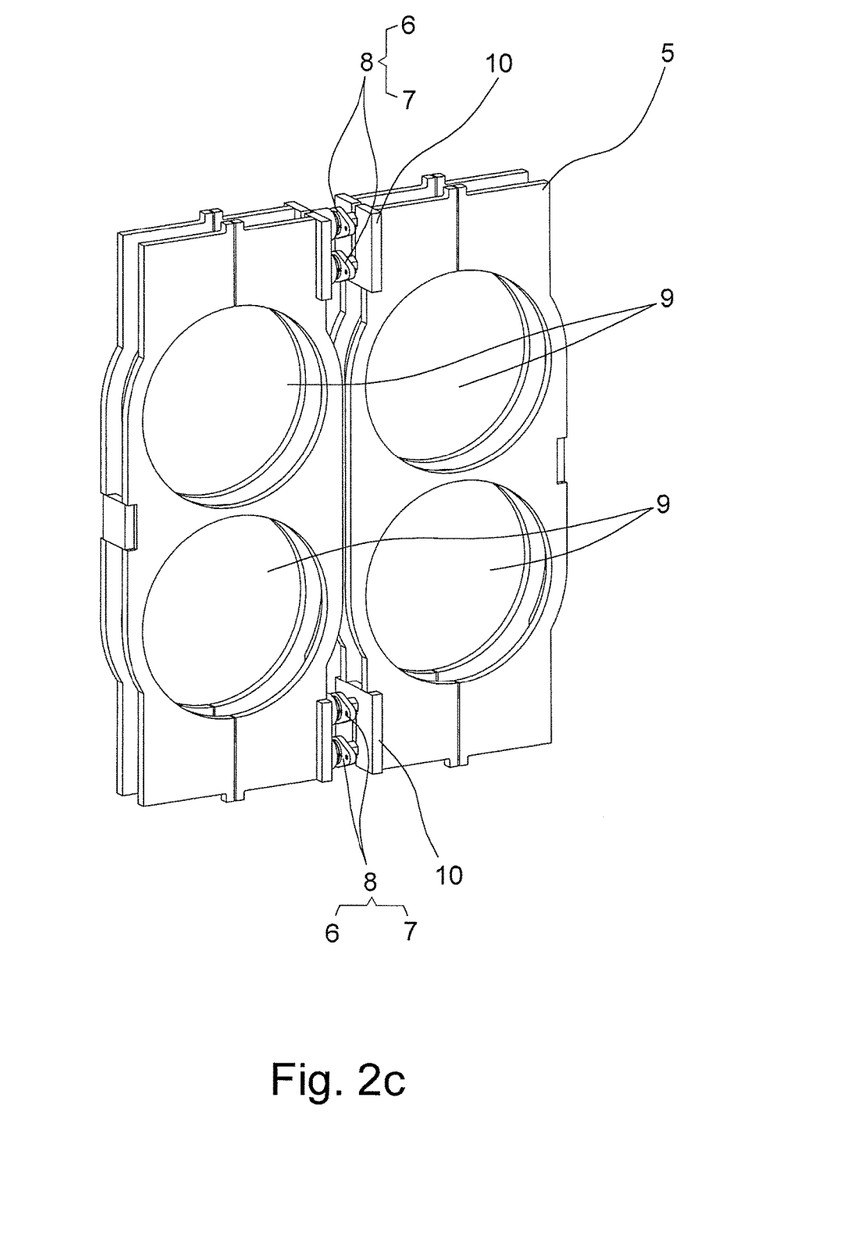
FIG. 2c is a perspective view of an embodiment of a holding device with primary and secondary oscillation sensors.
Figure 5A:
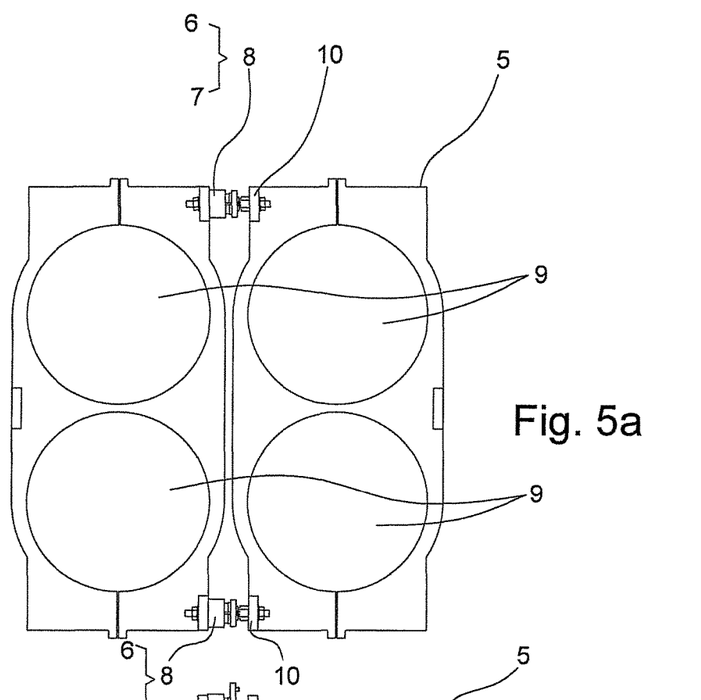
FIG. 5a is a front view of an embodiment of a holding device with primary and secondary oscillation sensors, FIG. 5b an embodiment of a holding device with primary and secondary oscillation sensors, in a top view.
Figure 5B:
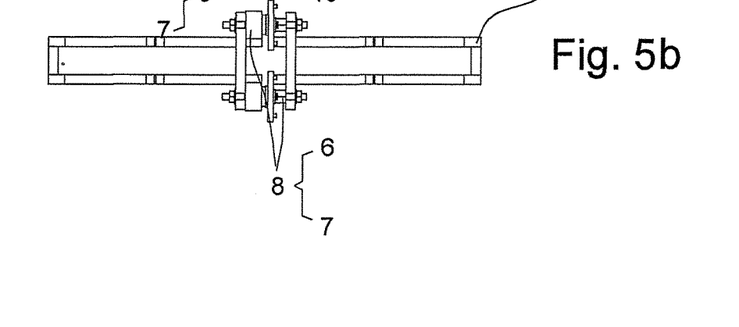
Figure 5C:
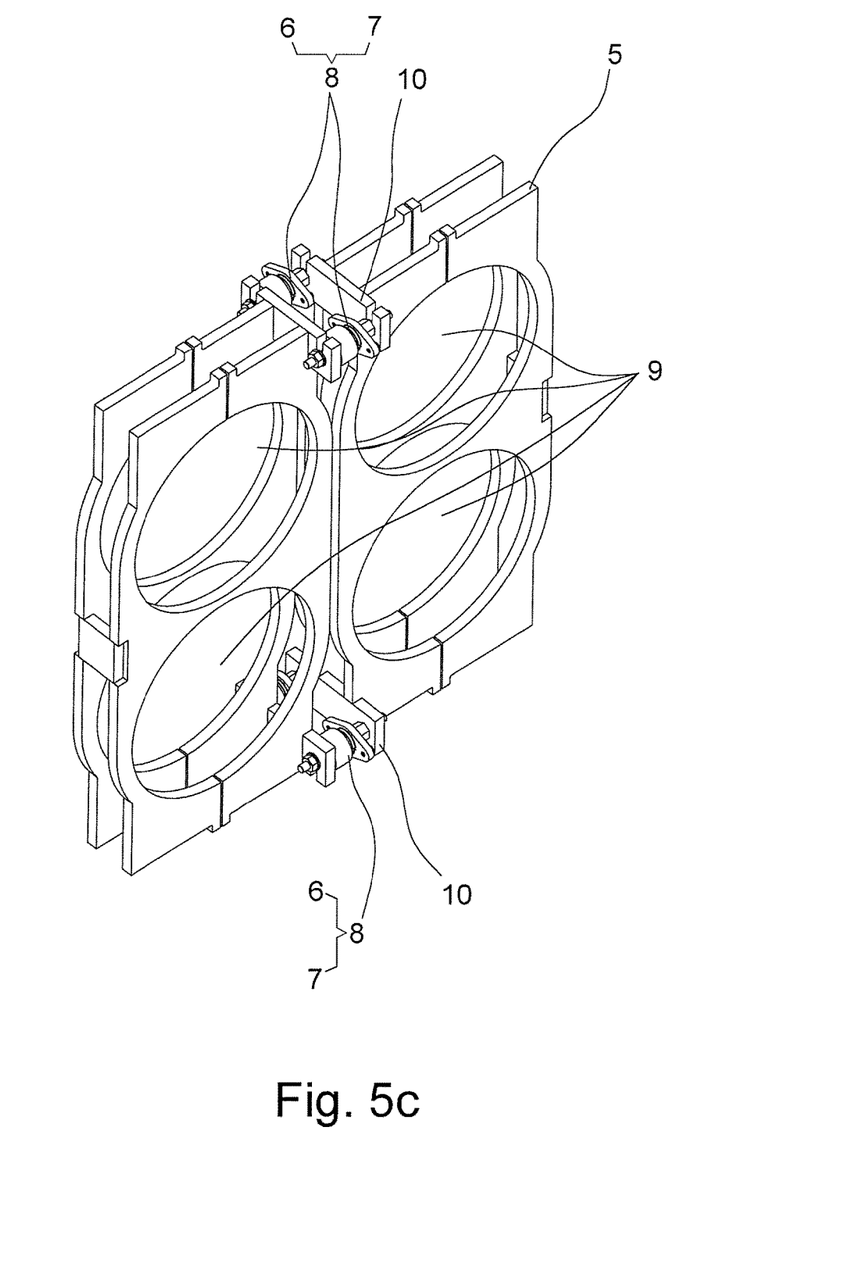
FIG. 5c is a perspective view of an embodiment of a holding device with primary and secondary oscillation sensors.

In FIG. 2, an embodiment of a holding device 5 with a primary oscillation sensor 6 and a secondary oscillation sensor 7 is shown, overall, in different views. In FIGS. 1 and 5, the assigned sensors 8 have the same axial distance to the oscillation generator 3. Recesses 9 are provided on the holding device 5, so that it can be pushed onto the measuring tubes 2 shown in FIG. 1, and optionally, can be welded to them. The sensors 8 of the oscillation sensor 4 are attached to attachment lugs 10.

FIGS. 2a and 2b show the same holding device 5 as FIG. 2c, in different views. It is made clear by the top view in FIG. 2b that the sensors 8 are arranged over one another and that all sensors 8 are located on one axis.

Figure 3:
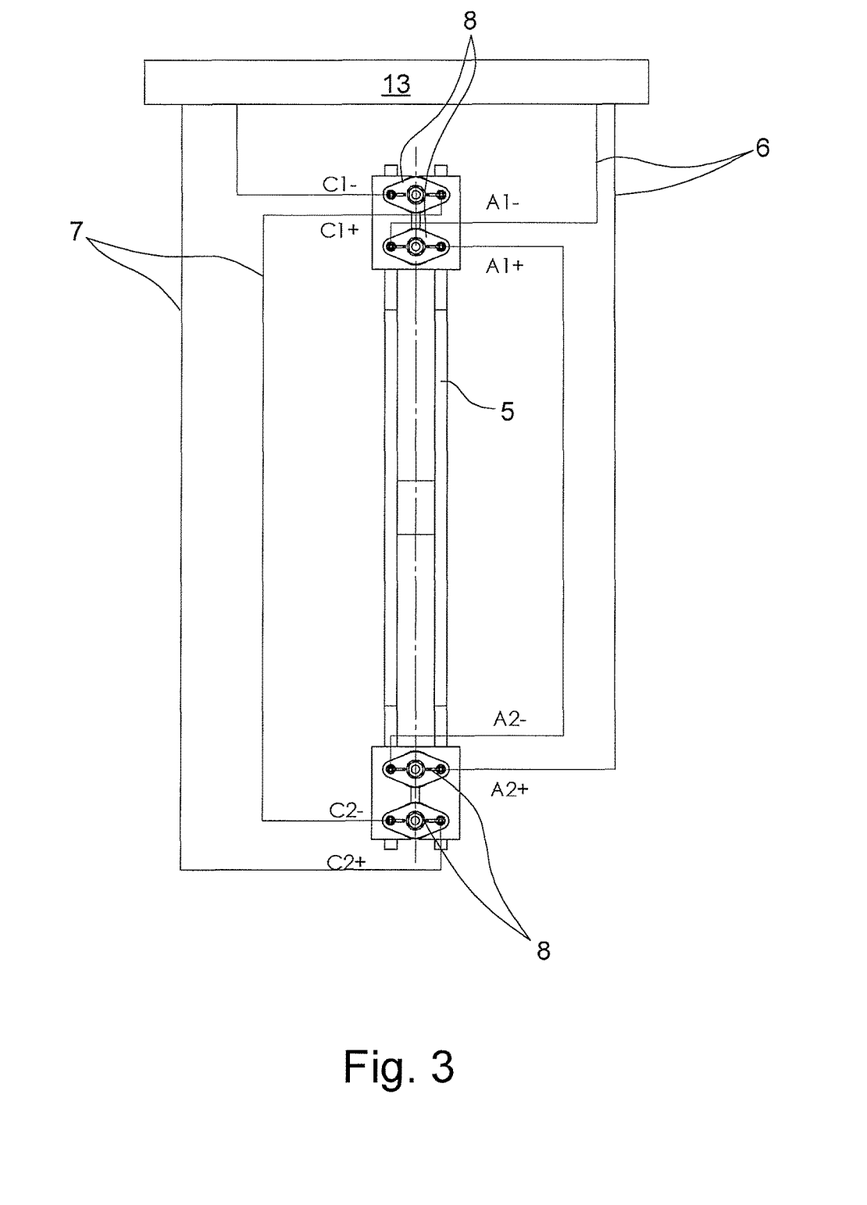
FIG. 3 shows an embodiment of a connection of sensors of the primary and secondary oscillation sensors with the same axial distance to the oscillation generator.

FIG. 3 shows a possible connection of the sensors 8, in order to form a primary oscillation sensor 6 and a secondary oscillation sensor 7, each of two sensors 8. In this embodiment, in which the sensors 8 have the same axial distance to the oscillation generator 3 (FIGS. 1 and 5), the primary oscillation sensor 6 is formed by connecting the two sensors 8 that have a smaller distance to the measuring tube, which is not shown. The secondary oscillation sensor 7 is given by the connection of the two outermost sensors 8, i.e., the sensors 8 having a greater distance to the measuring tube. The signals of the two oscillation sensors 4 can then be processed by the evaluation unit 13.

Figure 4:
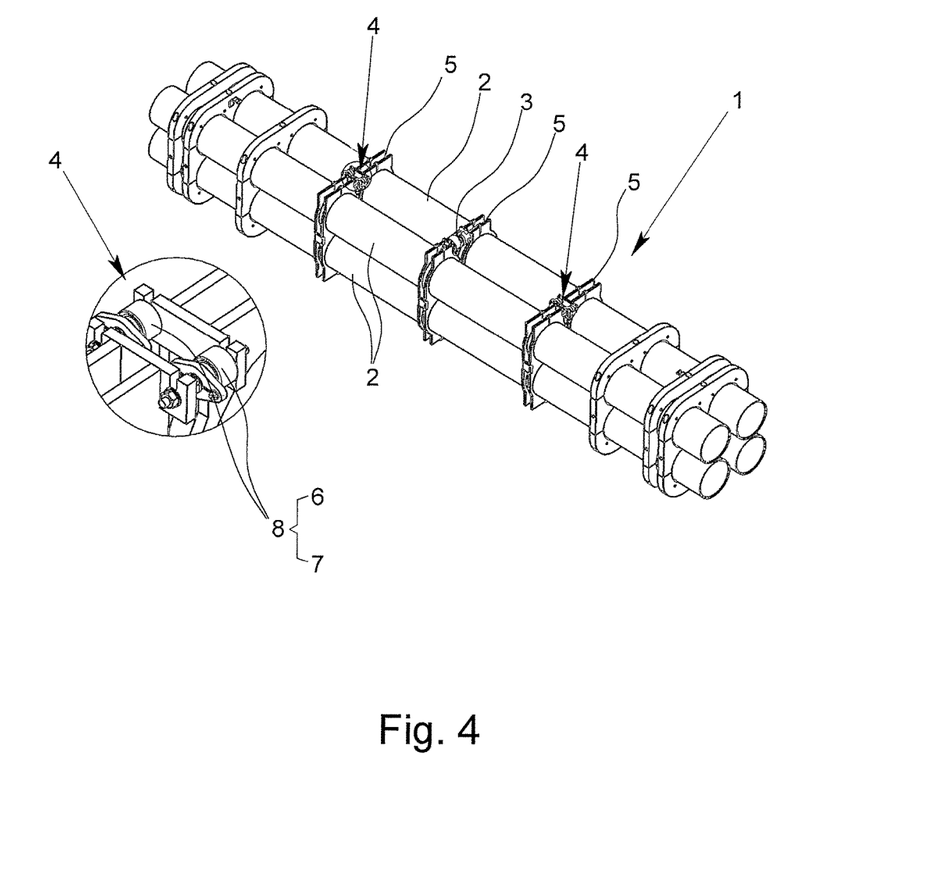
FIG. 4 is a perspective view of an embodiment of a Coriolis mass flowmeter.

FIG. 4 shows a Coriolis mass flowmeter 1 according to FIG. 1, wherein the sensors 8 of the oscillation sensor 4 have different axial distances to the oscillation generator 3 in this embodiment.

In FIG. 5c, the difference is made clearer by the perspective representation of the holding device 5. The sensors 8 are no longer located on one axis, but rather, two sensors 8 are located on an axis nearly parallel to the measuring tube. Further designs are possible thereby, in which two sensors on one side of the holding device 5 do not have the same distance to the measuring tube 2 (not shown).

FIGS. 5a and 5b show the same holding device 5 as FIG. 5c, in different views. It is made clear by the top view in FIG. 5b that the sensors 8 on one side of the holding device 5 are arranged next to one another. The opposingly situated sensors 8 are congruent in the top view, i.e., two opposingly situated sensors 8 and two sensors located next to one another are located on one axis.

Figure 6:
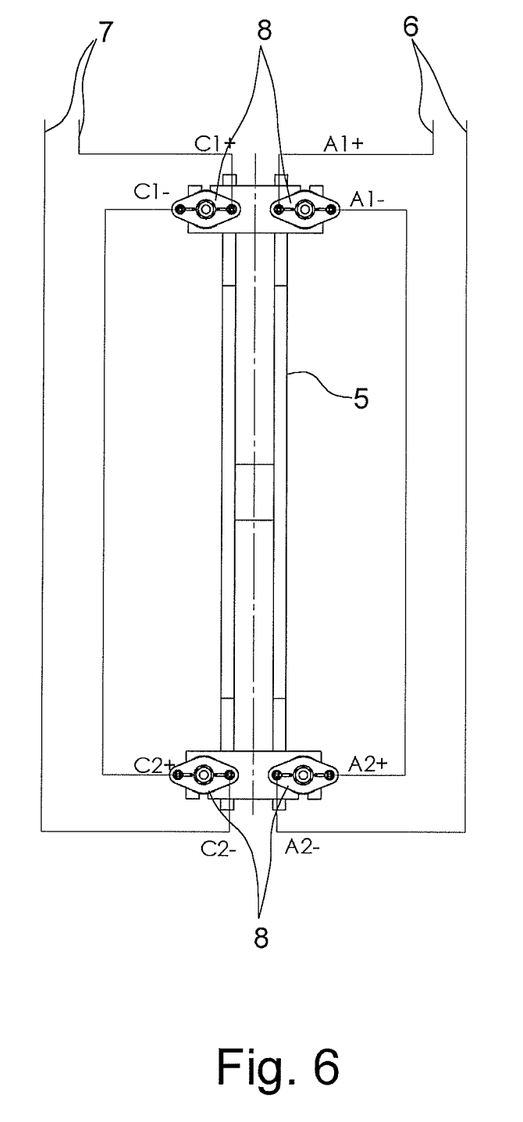
FIG. 6 shows an embodiment of a connection of sensors of the primary and secondary oscillation sensors having different axial distances to the oscillation generator.
Figure 7:
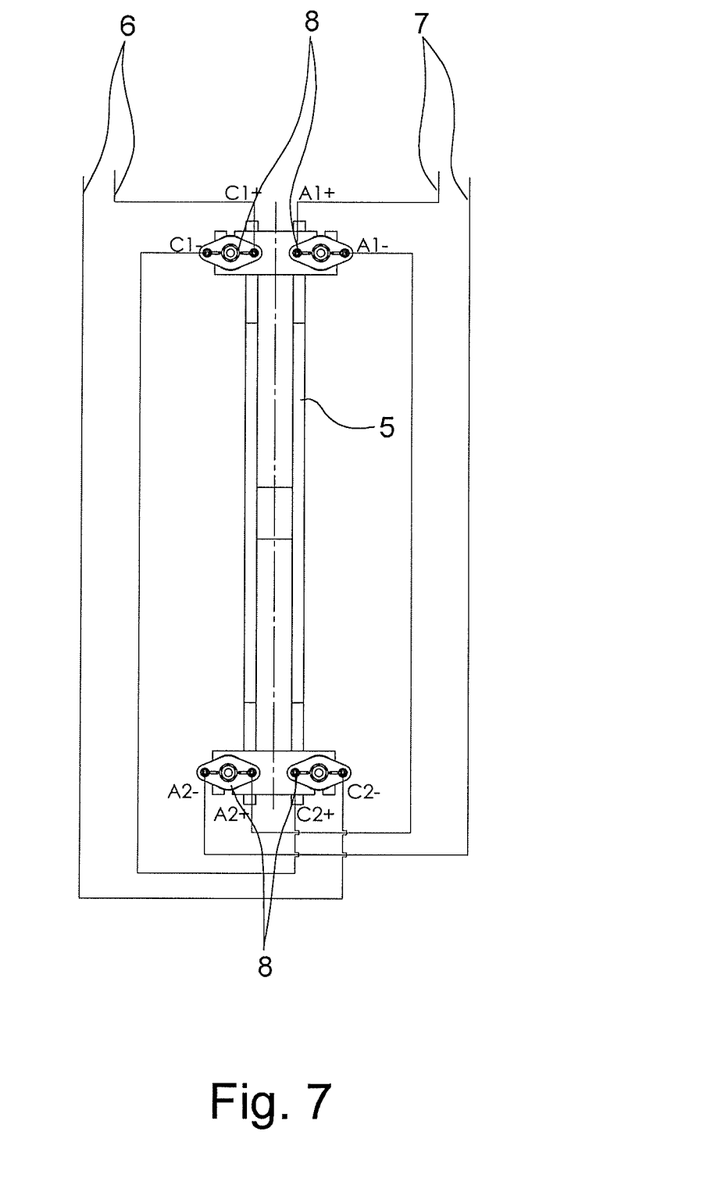
FIG. 7 shows a further embodiment of a connection of sensors of the primary and secondary oscillation sensor having different axial distances to the oscillation generator.

FIGS. 6 & 7 show further connection possibilities of the sensors 8 according to the embodiment in FIGS. 4 & 5. The primary oscillation sensor 6, for example, can be formed by connecting two sensors located on an axis that is situated orthogonally to the measuring tube 2 (FIG. 6). It is also possible, that the sensors 8 are connected "crossed-over" (FIG. 7) and one sensor 8 has a greater distance to the oscillation generator 3 than the other.

Figure 8:
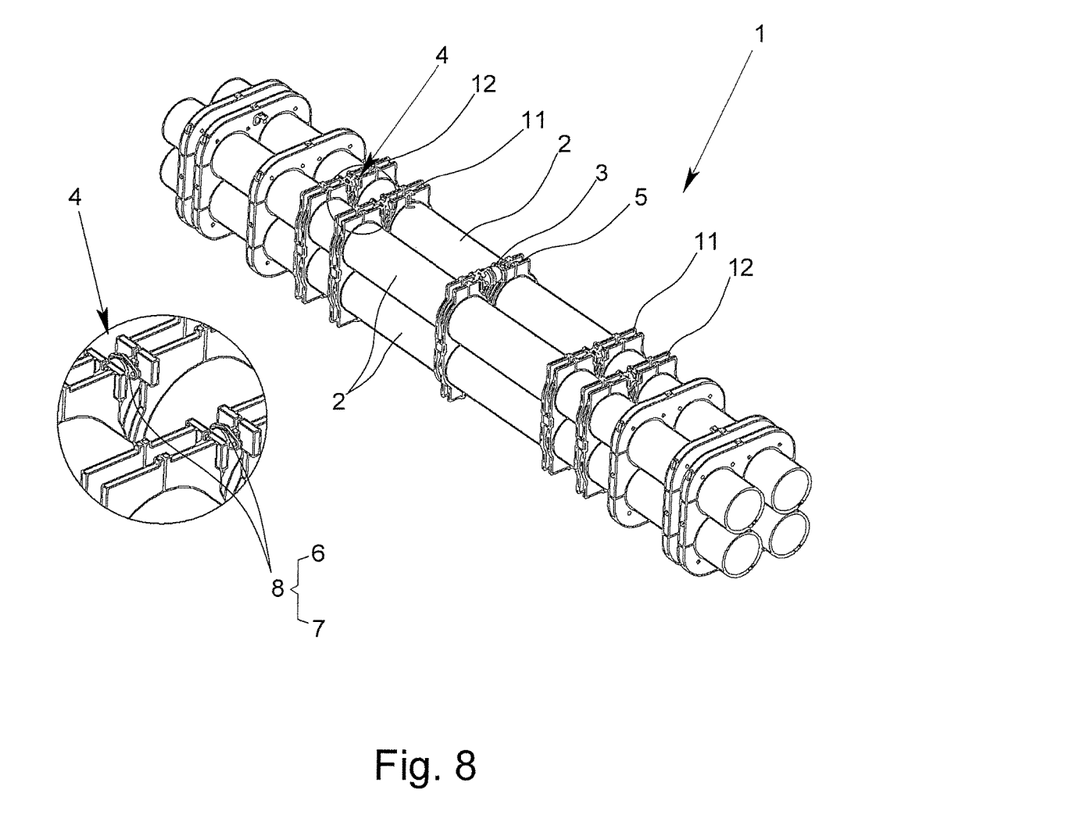
FIG. 8 is a perspective view of an embodiment of a Coriolis mass flowmeter.

FIG. 8 shows an embodiment of a Coriolis mass flowmeter 1 according to the invention in which the holding device 5 is formed of a first part 11 and a second part 12. The sensors 8 are attached to the attachment lugs 10 of the holding device 5, as in the previous embodiments.

It is possible that the primary oscillation sensor 6 is located either only on the first part 11 or the second part 12 of the holding device 5, or however, both on the first part 11 and on the second part 12. The connection of the sensors 8 can also be implemented as in the previous embodiments.

What is claimed is:

1. A Coriolis mass flowmeter (1) having at least one measuring tube (2) wherein each one of the at least one measuring tube conducts a flow of medium and is excitable to oscillations generated by at least one oscillation generator (3), at least two oscillation sensors (4), one at the inlet side, one at the outlet side of a same one of the at least one measuring tube, for receiving by Coriolis force oppositely influenced oscillation parts of the measuring tube oscillation, at least one evaluation unit (13) and at least two holding devices (5) for holding the oscillation sensors (4), wherein at least one part of an oscillation sensor (4) is attached to each holding device (5), wherein each holding device (5) is attached directly to each of the at least one measuring tube (2), and wherein the oscillation generator (3) is located between the oscillation sensors (4), characterized in that the oscillation sensors (4) each comprise at least one primary oscillation sensor (6) and a secondary oscillation sensor (7), and that the primary oscillation sensor (6) and the secondary oscillation sensor (7) are connected to the evaluation unit (13) in such a manner that a measuring signal of the primary oscillation sensor (6) and a measuring signal of the secondary oscillation sensor (7) are separately detectable by the evaluation unit (13) wherein at least one of the primary oscillation sensor (6) and the secondary oscillation sensor (7) of at least one of the oscillation sensors (4) comprises at least two sensor units (8) electrically connected to one another in a manner enabling the connected at least two sensor units to detect the same oscillations of each one of the at least one measuring tube.

2. The Coriolis mass flowmeter (1) according to claim 1, characterized in that the sensor units (8) of the oscillation sensors (4) are attached on opposite sides of a holding device (5), so that the measuring tube (2) is located between the two sensor units (8).

3. The Coriolis mass flowmeter (1) according to claim 2, characterized in that the sensor units (8) of the primary oscillation sensor (6) have a smaller or greater distance to the measuring tube (2) than the sensor units (8) of the secondary oscillation sensor (7).

4. The Coriolis mass flowmeter (1) according to claim 2, characterized in that at least one of the oppositely arranged sensor units (8) of the primary oscillation sensor (6) and the oppositely arranged sewers sensor units (8) of the secondary oscillation sensor (7) have different distances to the measuring tube (2).

5. The Coriolis mass flowmeter (1) according to claim 1, characterized in that the primary oscillation sensor (6) and the secondary oscillation sensor (7) have the same axial distance to the oscillation generator (3).

6. The Coriolis mass flowmeter (1) according to claim 1, characterized in that the primary oscillation sensor (6) and the secondary oscillation sensor (7) have axial distances to the oscillation generator (3) that differ from one another.

7. The Coriolis mass flowmeter (1) according to claim 6, characterized in that the sensor units (8) of the primary oscillation sensor (6) and the sensor units (8) of the secondary oscillation sensor (7) each have different distances to the oscillation generator (3).

8. The Coriolis mass flowmeter (1) according to claim 1, characterized in that the primary oscillation sensor (6) and the secondary oscillation sensor (7) are each attached to two separate parts of a holding device (5).

9. The Coriolis mass flowmeter (1) according to claim 1, characterized in that the evaluation unit (13) can simultaneously evaluate the signals of the primary oscillation sensor (6) and the signals of the secondary oscillation sensor (7), so that a higher measuring accuracy can be achieved by adding up the signals.

10. The Coriolis mass flowmeter (1) claim 1, characterized in that the evaluation unit (13) evaluates only the signals of the primary oscillation sensor (6) or of the secondary oscillation sensor (7) permanently and the signals of the other of the primary and secondary oscillation sensor (4) is operable as a reference for the calibration of the permanently used oscillation sensor (4).

* * * * *